(12) United States Patent
Chen et al.

(10) Patent No.: US 6,240,834 B1
(45) Date of Patent: Jun. 5, 2001

(54) AUTOMATIC RESETTING SAFETY CUT-OUT DEVICE FOR TOASTER SLIDING SUPPORT BLOCKAGE

(75) Inventors: Huajin Chen; Xiaoxing Shen, both of Guangdong (CN)

(73) Assignee: SEB S.A. (FR)

( * ) Notice: Subject to any disclaimer, the term of this patent is extended or adjusted under 35 U.S.C. 154(b) by 0 days.

(21) Appl. No.: 09/676,859

(22) Filed: Sep. 29, 2000

(30) Foreign Application Priority Data

Sep. 29, 1999 (CN) ................................ 99246024

(51) Int. Cl.⁷ ........................................... A47J 37/08
(52) U.S. Cl. .............. 99/327; 99/329 P; 99/329 RT; 99/332; 99/337; 99/385; 99/389; 99/391; 219/521
(58) Field of Search .............. 99/325–335, 337, 99/338, 339, 340, 385–391, 399–402, 426, 486; 219/518, 519, 521, 386, 481, 489, 413, 492, 493, 497; 426/241, 243, 466, 523

(56) References Cited

U.S. PATENT DOCUMENTS

| | | | |
|---|---|---|---|
| 1,893,989 | * 1/1933 | Galer | 99/390 X |
| 1,926,276 | * 9/1933 | Forbes | 99/332 |
| 1,967,209 | * 7/1934 | Lawrence | 99/327 |
| 1,979,845 | * 11/1934 | Schallis | 99/332 |
| 2,631,523 | * 3/1953 | Olving | 99/331 X |
| 3,956,978 | * 5/1976 | Borley | 99/329 R |
| 4,345,513 | * 8/1982 | Holt | 99/401 X |
| 5,018,437 | * 5/1991 | San Juan | 99/327 |
| 5,044,263 | * 9/1991 | Birkert et al. | 99/327 |
| 5,304,782 | * 4/1994 | McNair et al. | 219/497 X |
| 5,771,780 | * 6/1998 | Basora et al. | 99/389 X |
| 5,802,957 | * 9/1998 | Wanat et al. | 219/521 X |
| 6,014,925 | * 1/2000 | Basora et al. | 99/327 |

* cited by examiner

Primary Examiner—Timothy F. Simone
(74) Attorney, Agent, or Firm—Lerner, David, Littenberg, Krumholz & Mentlik, LLP

(57) ABSTRACT

An electric cut-off device for a toaster is disclosed including a housing, a timer for setting a toasting time, the timer including a core and an armature attracted by the core upon its actuation, a slidable support mounted for slidable movement within the housing, a button for controlling the movement of the slidable support, a carrier carried by the slidable support for carrying the toast, a heater for heating the toast, a switch for actuating the heater, the switch juxtaposed with the armature whereby the switch is actuated when the armature is adjacent to the core and the heater, the core and the timer are deactivated after expiration of the toasting time, and the slidable support is released.

3 Claims, 6 Drawing Sheets

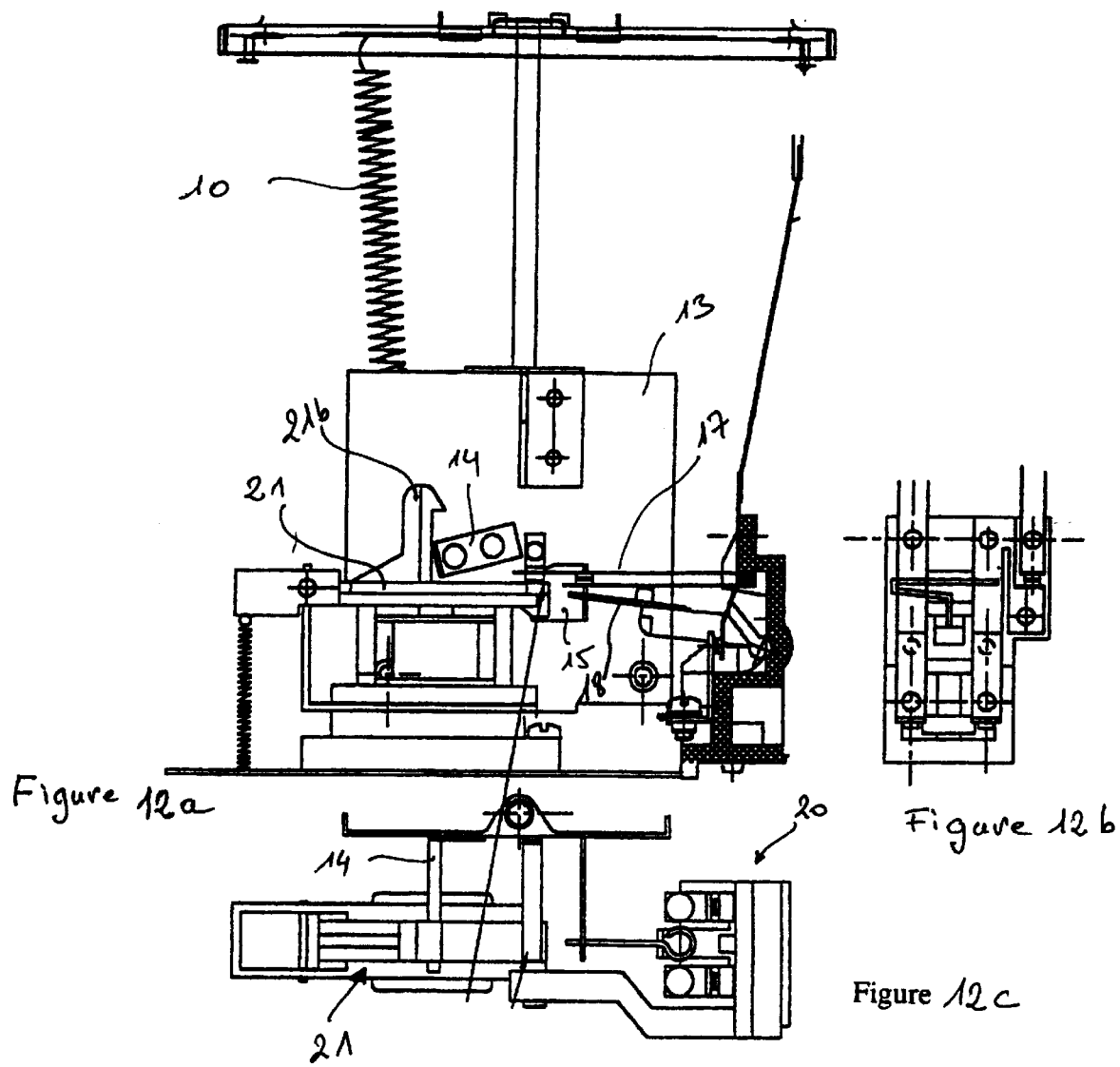

AUTOMATIC RESETTING SAFETY CUT-OUT DEVICE FOR TOASTER SLIDING SUPPORT BLOCKAGE

FIELD OF THE INVENTION

The present invention relates to an automatic resetting safety cut-out device for a toaster sliding support blockage. More particularly, the present invention relates to an automatic resetting safety cut-out device for a toaster sliding support blockage suitable for toasting bread.

BACKGROUND OF THE INVENTION

Electric toasters using current technologies are generally made up of an outer shell, a button, a base, an electronic timer and a core, their main functions being timing and resetting. The principal method of using these toasters is for toasting bread slices to a golden brown, with the user being able to adjust the time required so that the bread slices are toasted to a color meeting the user's preference. The working sequence is as follows.

The user inserts the power plug of the toaster in a power socket and places bread in the bread slots of the toaster, with the sliding support and carrier connected to the button and supporting the bread. The knob is adjusted to set the electronic timer to the toasting time required, and the button is pressed down, whereby the sliding support and the carrier take the bread downwards to the bottom of the slots, at which time the switch connects to the power source and power is supplied to the coil on the electronic timer, the armature is attracted, and the switch maintains continuous connection, with the button, sliding support and support remaining in their original position.

The heating element thus begins to work and toast the bread, and when the toasting time reaches the time set on the electronic timer, power is cut off to the coil on the electronic timer, the armature disengages, and the button, sliding support and support spring the bread upwards to the normal position. However, for various reasons, and because of certain defects in the toaster itself, the toaster's sliding support and carrier can get stuck, or not spring back to the correct position because of the bread or for other reasons. The time set on the electronic timer is reached, power is cut off to the coil, and the armature loses its attractive power, but the sliding support and the carrier are still unable to spring back to the correct position, so that the toaster's on/off switch is unable to cut off the power, leading to a prolonged connection of the toaster's heating elements to the power source, so that the bread continues to toast until it is burnt or until a fire breaks out.

One object of the present invention is to augment and modify some of the pans in the existing toaster structure to design this automatic resetting safety cut-out device for a toaster sliding support blockage, so that even when the sliding support and carrier of the toaster get stuck or do not spring back to the correct position, and the toaster's on/off switch does not cut off the power supply, a pair of contacts in the newly added safety cut-out device will automatically open and cut off the power supply when the timer operates normally, so that electricity is cut off to the toaster, thus effectively ensuring the safety of the toaster and avoiding accidents.

SUMMARY OF THE INVENTION

In accordance with the present invention, this and other objects have now been realized by the invention of an automatic cut-off device for a toaster including a housing, a timer for setting a predetermined toasting time, the timer including an actuatable core and an armature attractable by the actuatable core upon actuation thereof, a slidable support mounted for slidable movement within the housing from a first inactive position to a second active position, a button for controlling the movement of the slidable support, a carrier carried by the slidable support for carrying the toast, heating means for heating the toast, a switch for actuating the heating means, the actuatable core and the timer, the switch juxtaposed with the armature whereby the switch is actuated when the armature is adjacent to the actuatable core and the heating means, the actuatable core and the timer are deactivated after the predetermined toasting time, and the slidable support is released, the cut-off device comprising a cut-out contact movable between a first open position and a second closed position in which the cut-out contact actuates the switch, the armature comprising an actuator pivotally mounted within the housing for movement between a rest position and an engaged position adjacent to the actuatable core, means for normally urging the actuator into the rest position, the slidable support including an engagement member for engaging the actuator upon movement of the slidable support into the second active position, thereby urging the actuator into the engaged position, the actuator positioned adjacent to the cut-out contact whereby when the actuator is in the rest position the actuator supports the cut-out contact in the first open position and when the actuator is moved to the engaged position the cut-out contact is urged into the second closed position for actuating the switch, followed by deactivation after the predetermined toasting time, permitting the means for urging the actuator to the rest position to urge the actuator to the rest position irrespective of the position of the slidable support.

In accordance with a preferred embodiment of the automatic cut-off device of the present invention, the actuator includes a first end comprising an upright member, the actuator being pivotable about the first end, and a second end comprising an extending member comprising a movable support for the cut-out contact, the slidable support including a coupling disposed at a location for contact with the upright member upon movement of the slidable support towards the second active position and a pressure plate disposed at a location for contact with the extending member upon movement of the slidable support towards the second active position.

In accordance with another embodiment of the automatic cut-off device of the present invention, the device includes a steel wire extending from the switch and movable between a first upward position in which the switch is actuated and a second downward position in which the switch is deactivated, the steel wire disposed at a location corresponding to the pressure plate whereby upon movement of the slidable support towards the second active position the pressure plate causes the steel wire to move towards the second position, and the steel wire causes the actuator to move towards the engaged position whereby the cut-out contact is urged into the second closed position.

The objects of the present invention are attained by an automatic resetting safety cut-out device for a toaster sliding support blockage fitted in an electric toaster having:

an outer shell including a base and bread slots, an electronic timer and core to set a toasting time, the electronic timer being part of an armature in which the core is able to produce magnetic forces attracting the armature and turning the switch on;

a sliding support connected to a button to control upwards and downwards movements and positions of the support which is connected to a carrier to support bread in the bread slots, heating means, such that when the sliding support and carrier have moved to their downwards position, the toaster is switched on, the heating elements, the electronic timer and core are connected and operate, and once the toasting time is reached, power is cut off to the heating elements, the sliding support and carrier being disengaged and intended to rise to their upwards position, characterized in that the device has a cut out spring adapted to connect/disconnect the heating elements, a pivoting element mounted in the toaster so that it can be engaged by the sliding support during its downwards movement, the pivoting element on the one hand, being urged in a first resting elastic position in which it supports the cut out spring which is then in its disconnecting position, and on the other hand, when engaged by the sliding support, adapted to move to a second resting position corresponding to the downwards position of the carrier, in which the carrier or sliding support is maintained by the magnetic force of the core, while the cut out spring connects the heating elements, the arrangement being such that when the toasting time reaches that set time, the pivoting element is able to be automatically urged towards its first resting elastic position regardless of the position of the carrier or the sliding support.

BRIEF DESCRIPTION OF THE DRAWINGS

The present invention may be more fully appreciated with reference to the following detailed description, which, in turn, refers to the drawings in which:

FIG. 12a is side, elevational, partially schematic view of one embodiment of the device of the present invention;

FIG. 12b is a side, elevational, partially schematic view of the device shown in FIG. 12a; and FIG. 12c is a top, elevational, partially schematic view of the device shown in FIG. 12a.

DETAILED DESCRIPTION

Figure 2:
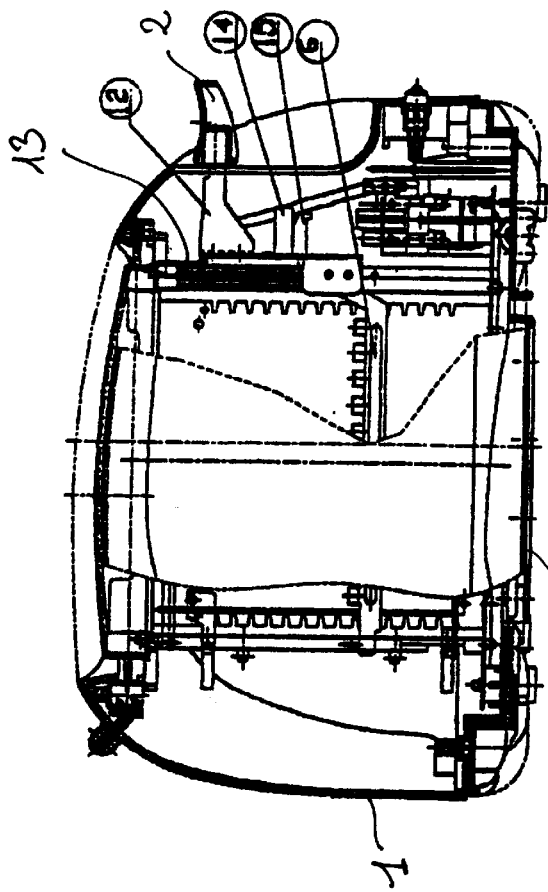
FIG. 2 is a side, elevational, partially sectional, partially schematic view of the device shown in FIG. 1.
Figure 3:
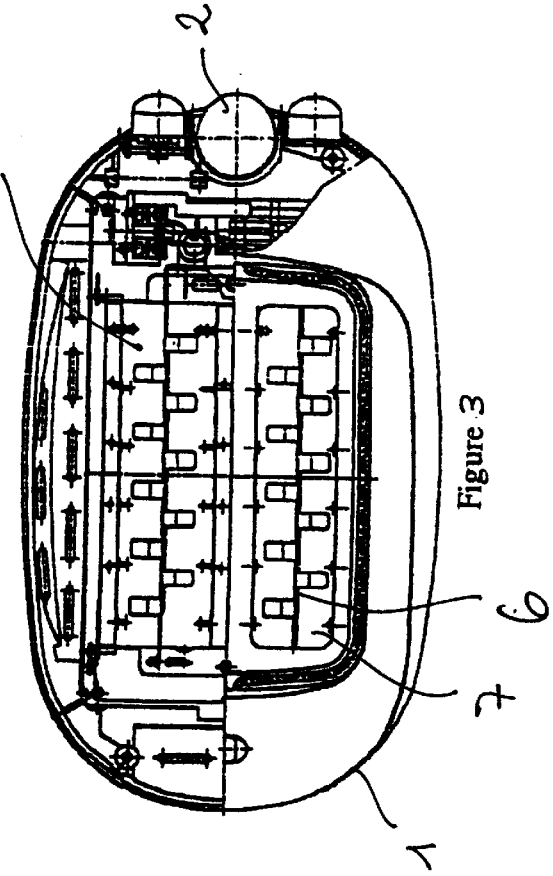
FIG. 3 is a top, elevational, partially sectional, partially schematic view of the device shown in FIG. 1.
Figure 1:
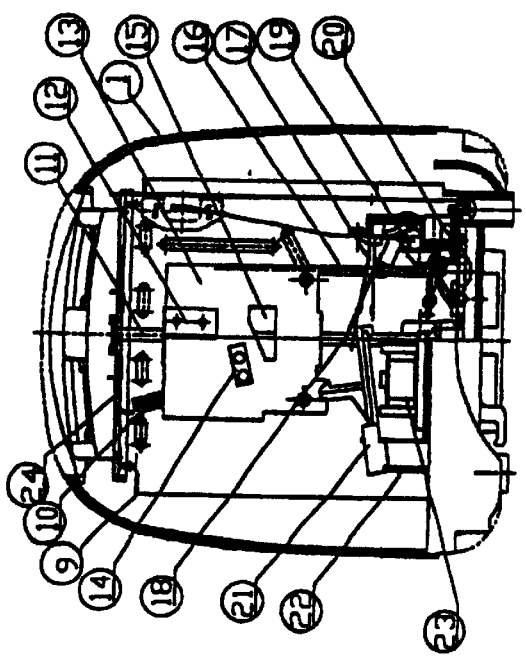
FIG. 1 is a front, elevational, sectional, partially schematic view of the automatic resetting safety cut-off device for a toaster in accordance with the present invention.
Figure 4:
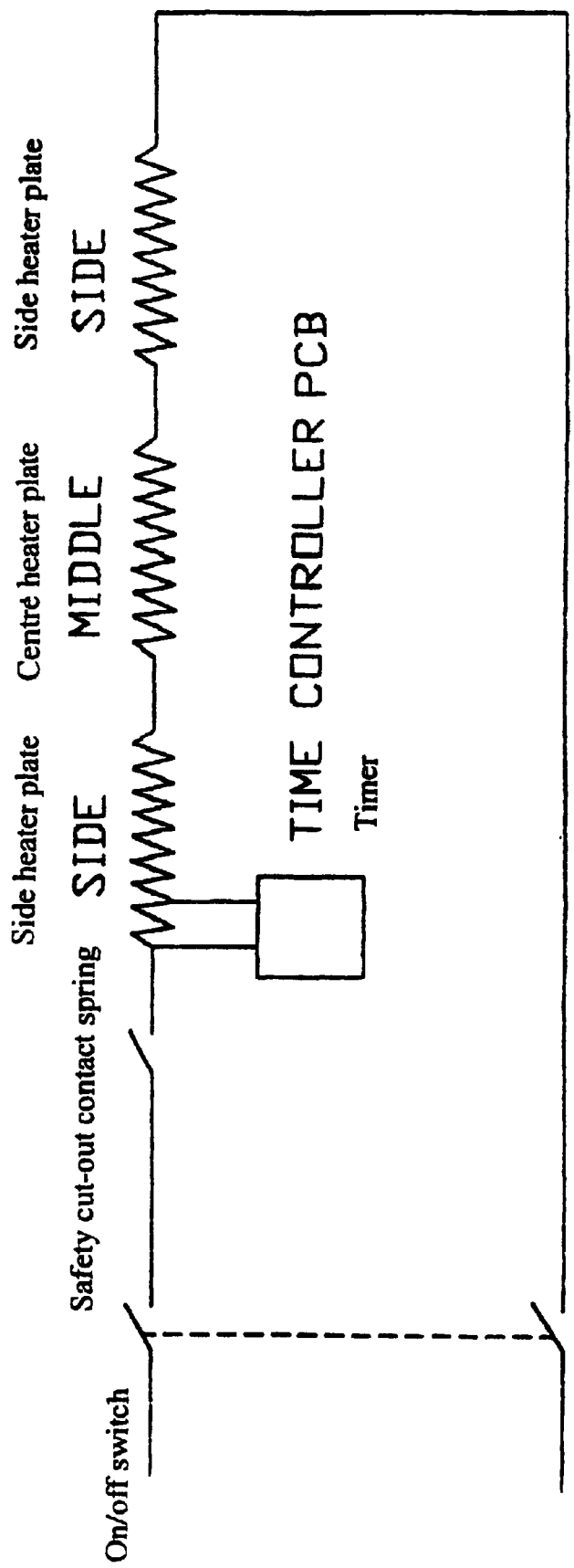
FIG. 4 is a circuit diagram of the operation of a toaster in accordance with the present invention.

The objects of the present invention are realized as follows:

The present invention is placed inside an electric toaster composed of such parts as an outer shell 1, button 2, a base 5, an electronic timer and core, and in the toaster's bread slots 7, there is a sliding support 13 connected to a button 2 and carrier 6 to support the bread. When connected to the power supply, the coil 23 on the electronic timer receives power, and the armature is attracted, the switch closes, and the heating elements operate with the passage of current.

After the toasting time set on the electronic timer has elapsed, power is cut off to the coil 23 on the electronic timer, the armature 21 is disengaged, and the button 2, sliding support 13, and carrier 6 spring the toast back to its normal position. The present invention is characterized by one end of the armature support 21 being fixed and the other end rising to form a lever-type support for the safety cut-out contact spring 17, the safety cut-out contact spring 17 connecting the on/off switch in series to the heating elements; the sliding support 13 being fitted with a coupling 14 and a pressure plate 15, the coupling 14, corresponding to the upright rod on the armature support 21, and the pressure plate 15, corresponding to the horizontal rod location on the armature support 21.

The present invention can also have a pressure plate 15 fixed on the sliding support 13 with a spring steel wire 19 on the on/off switch pressure rod connected to a switch spring contact 19 on the switch seating 20. Under the downward-pulling action of the small tension spring 22, the armature support 21 rises and opens the safety cutout contact spring 17. As the sliding support 13 moves downward, the spring steel wire 18 on the on/off switch pressure rod presses down on the rising end of the armature support 21, the spring steel wire 18 overcoming the downward-pulling action of the small tension spring 22, pressing down on the rising end of the armature support 21, and causing the safety cut-out contact spring 17 to close the contacts.

The present invention can also have a small tension spring 22 connected to one end of the armature support 21 with the other end rising to press up on the safety cut-out contact spring 17, the safety cut-out contact spring 17 connecting the on/off switch in series to the heating elements; the sliding support 13 being fitted with a coupling 14 and pressure plate 15, the coupling 14 corresponding to the upright rod on the armature support 21, and the pressure plate 15 corresponding to the horizontal rod location on armature support 21.

The present invention can also have a spring steel wire 18, or spring steel blade, fixed on the sliding support 13, with the rising end of the armature support 21 pressing on the safety cut-out contact spring.

The present invention has the advantages of a simple structure, safety and reliability over the existing technology.

Figure 5:
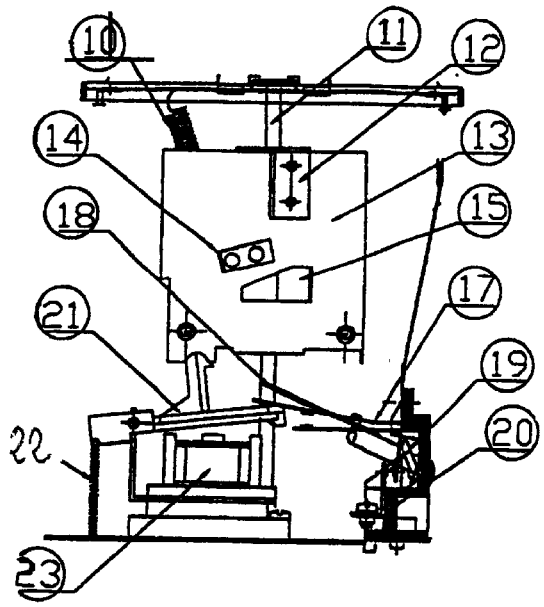
FIG. 5 is a side, elevational, partially schematic view of the safety cut-out device of the present invention in a first condition.

Referring to the drawings, in which like reference numerals refer to like elements thereof, in use, the user places slices of bread in the toaster bread slots 7, and the carrier 6 supports the slices of bread. When the bread in the toaster and the button 2 are in their normal positions, the state of the safety cut-out device is as shown in FIG. 5.

Figure 6:
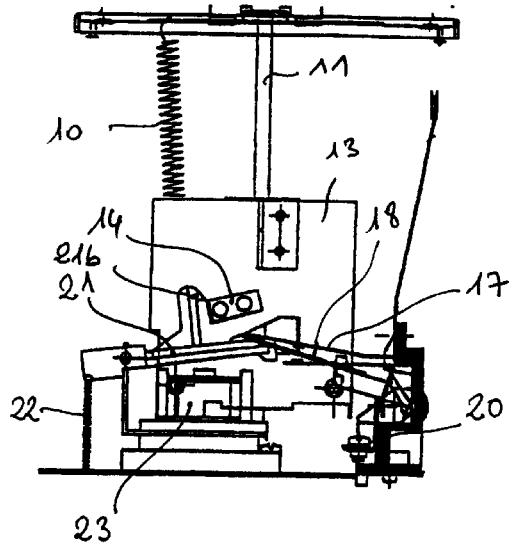
FIG. 6 is a side, elevational, partially schematic view of the device shown in FIG. 5 in a second condition.

After the plug is inserted in the power socket and the button 2 is pressed down, the sliding support 13, the handle 12 fixed on the sliding support 13 (a plastic button 2 is for instance connected to the handle 12), carrier 6, coupling 14 and pressure plate 15 together with the bread slices on the carrier 6 overcome the tension of the sliding support tension spring 10 and move downwards, and when the sliding support reaches the position shown in FIG. 6, the pressure plate 15 fixed on the sliding support 13 is pressed against the spring steel wire 18 on the on/off switch pressure rod, first making contact with the switch spring contact 19 on the switch seating 20, at which time the armature support 21 under the pulling action of the small tension spring 22 is still in the up position, opening the safety cut-out contact spring 17, so that no contact is made.

As the sliding support 13 continues to move downwards, the spring steel wire 18 on the on/off switch pressure rod presses on the rising end of the armature support 21. At this time the spring steel wire 18 overcomes the downward-pulling action of the small tension spring 22 on the armature support 21, so that the rising end of the armature support 21 is pressed down, at which time the safety cut-out contact spring 17 closes the circuit, and the timer PCB (not depicted here) connects to the power supply and begins its timing operation. Power is supplied to the toaster's heating elements and they begin to heat up (not depicted here) and toast the bread.

Figure 7:
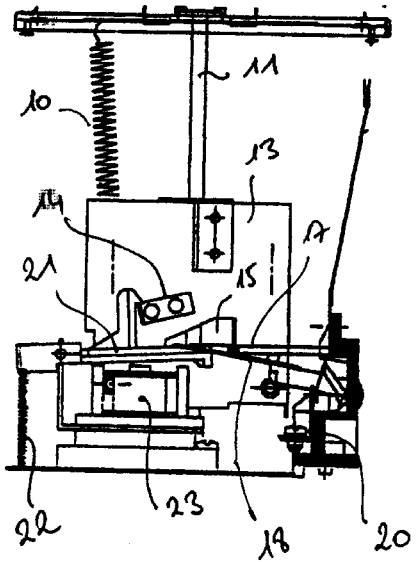
FIG. 7 is a side, elevational, partially schematic view of the device shown in FIG. 5 in yet another condition.

As a magnetic force is produced by the passage of electric current through the coil 23 on the timer, when the sliding support 13 continues to move downwards under the manually applied force, the spring steel wire 18 on the on/off switch pressure rod finally presses the armature support 21 downwards to a position where the magnetic force from the coil 23 enables the armature to be attracted and held, when it is in the state shown in FIG. 7.

Figure 8:
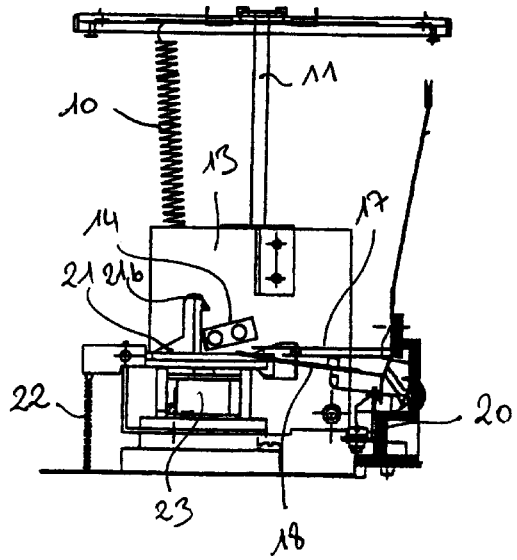
FIG. 8 is a side, elevational, partially schematic view of the device shown in FIG. 5 in yet another condition.

The armature on the armature support 21 is immediately attracted by the coil (iron core), at which time the locking hook 21b on the armature support 21 is placed in the vertical position beyond the position of the coupling 14, on the sliding support 13, as shown in FIG. 8.

When the sliding support 13 has moved downwards to the lower limit and the user relaxes his/her grip and does not continue pressing downwards on the button 2, the sliding support 13, together with the coupling 14, pressure plate 15, handle 12 and carrier 6 attached to the sliding support lose the downward manual pressure and are only subject to the downward force of gravity from the bread, which is insufficient to overcome the upward-pulling action on sliding support 13 by the tension spring 10 and the elastic reaction force of the pressure spring on the lower part of the sliding support 13 (not depicted here).

There is an upward reaction on the whole structure, but because the armature and the armature support 21 are attracted and held, the whole reaction force on the sliding support 13 is unable to move it upwards again because the coupling 14 is held by the locking hook on the armature support 21. As shown in FIG. 8, there is contact throughout this time between the safety cut-out contact spring 17 and the oil/off switch spring contacts 19, and the toaster remains in an operating state, and the bread remains in a state of being toasted.

Figure 9:
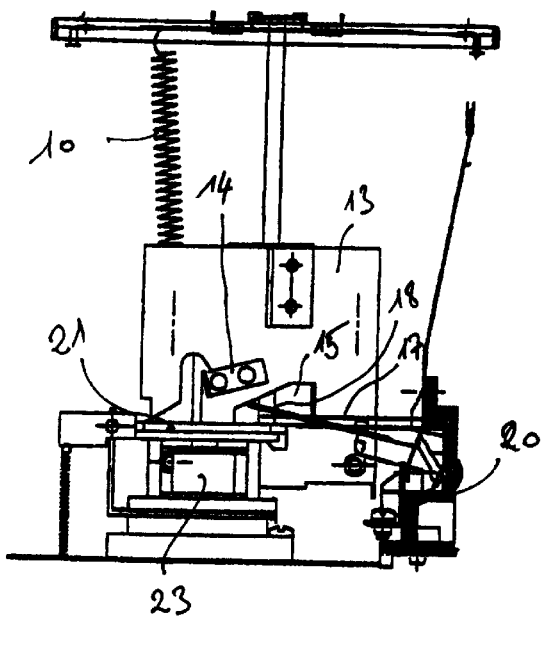
FIG. 9 is a side, elevational, partially schematic view of the device shown in FIG. 5 in yet another condition.
Figure 10:
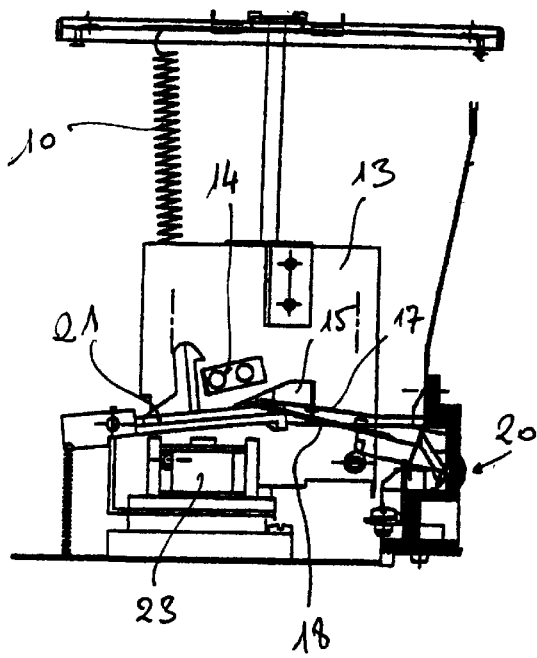
FIG. 10 is a side, elevational, partially schematic view of the device shown in FIG. 5 in yet another condition.
Figure 11:
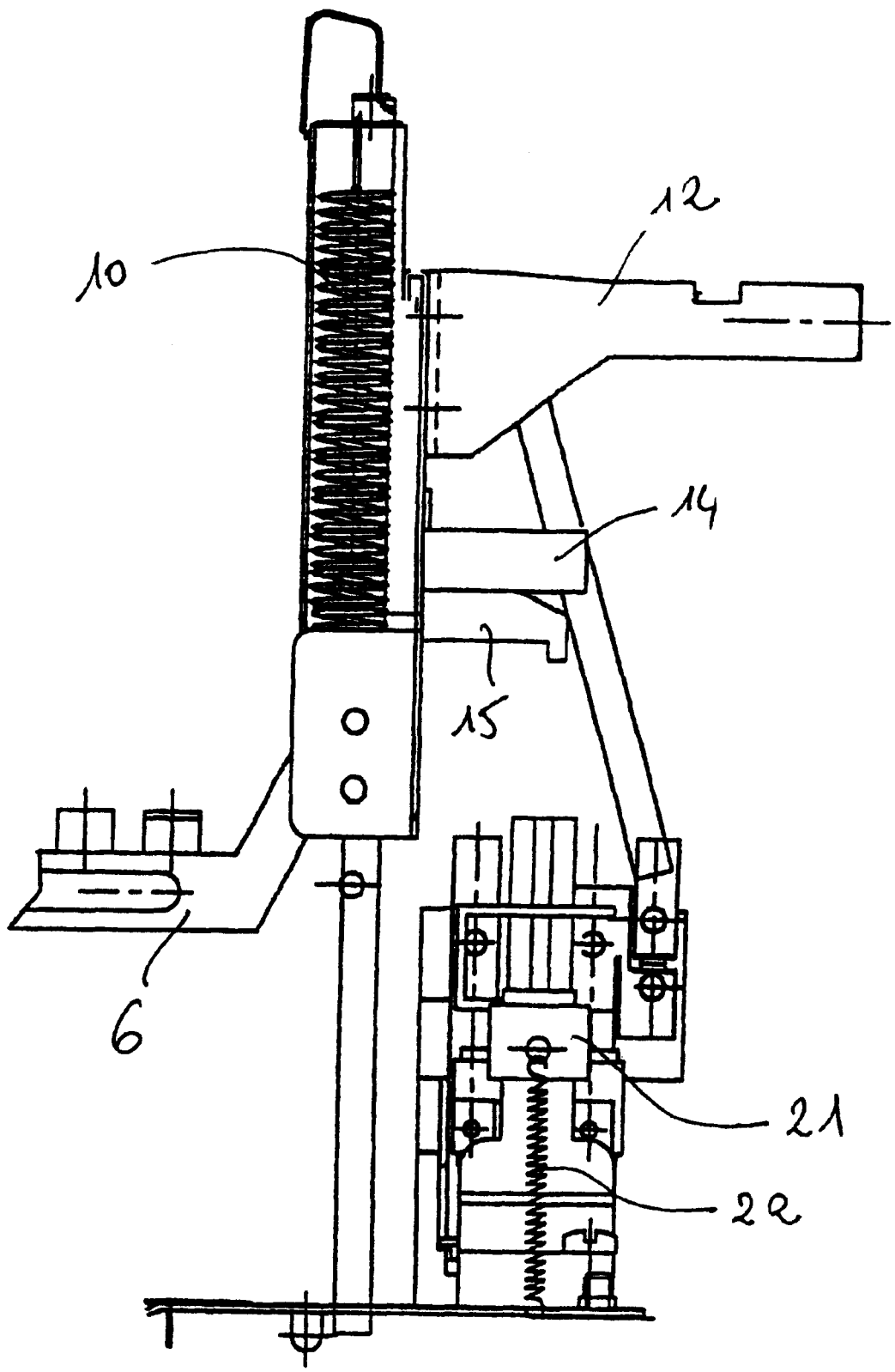
FIG. 11 is side, elevational schematic view of a portion of the device of the present invention.

When the electronic timer of the toaster (not shown) reaches the toasting time set, (i.e. the toaster has concluded the bread toasting process), the coil 23 on the electronic timer (not shown) has no current passing through it and so loses its magnetic force, and the armature support 21 is subject to the downward-pulling action of the small tension spring 22 which causes the other end to rise, and the rising end of the armature support 21 opens the safety cut-out contact spring 17, opening the contacts and cutting the power supply to the entire device. At this time, because the armature support rises, the coupling 14 on the sliding support 13, which was originally captured by the locking hook is no longer restrained by this hook, but if the sliding support 13 for various reasons gets stuck or jammed and cannot spring back or does not spring back to the correct position, contact cannot be broken with the on/off switch spring contact 17, as shown in FIG. 9.

However, because the safety cut-out contact spring 17 has already opened, at this point there is no power supply to the whole machine, and the toaster will not work irrespective of whether or not the on/off-switch is on or off This therefore avoids the occurrence of an accident caused by the continued passage of current because the on/off switch spring contacts 19 have not opened.

It is also possible to have the safety cut-out contact spring 17 made as an independent part.

It is also possible to have the spring steel blade and steel wire 18 fixed on the sliding support 13 for the purpose of resetting the armature support and causing the safety cut-out contact spring 17 to be reset in the closed position. Also, the safety cut-out contact spring 17, the armature support and the coil can be combined in a single component.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

We claim:

1. An automatic cut-off device for a toaster including a housing, a timer for setting a predetermined toasting time, said timer including an actuatable core and an armature attractable by said actuatable core upon actuation thereof, a slidable support mounted for slidable movement within said housing from a first inactive position to a second active position, a button for controlling the movement of said slidable support, a carrier carried by said slidable support for carrying said toast, heating means for heating said toast, a switch for actuating said heating means, said actuatable core and said timer, said switch juxtaposed with said armature whereby said switch is actuated when said armature is adjacent to said actuatable core and said heating means, said actuatable core and said timer are deactivated after said predetermined toasting time, and said slidable support is released, said cut-off device comprising a cut-out contact movable between a first open position and a second closed position in which said cut-out contact actuates said switch, said armature comprising an actuator pivotally mounted within said housing for movement between a rest position and an engaged position adjacent to said actuatable core, means for normally urging said actuator into said rest position, said slidable support including an engagement member for engaging said actuator upon movement of said slidable support into said second active position, thereby urging said actuator into said engaged position, said actuator positioned adjacent to said cut-out contact whereby when said actuator is in said rest position said actuator supports said cut-out contact in said first open position and when said actuator is moved to said engaged position said cut-out contact is urged into said second closed position for actuating said switch, followed by deactivation after said predetermined toasting time, permitting said means for urging said actuator to said rest position to urge said actuator to said rest position irrespective of the position of said slidable support.

2. The automatic cut-off device of claim 1 wherein said actuator includes a first end comprising an upright member, said actuator being pivotable about said first end, and a second end comprising an extending member comprising a movable support for said cut-out contact, said slidable support including a coupling disposed at a location for contact with said upright member upon movement of said slidable support towards said second active position and a pressure plate disposed at a location for contact with said extending member upon movement of said slidable support towards said second active position.

3. The automatic cut-off device of claim 2 including a steel wire extending from said switch and movable between a first upward position in which said switch is actuated and a second downward position in which said switch is deactivated, said steel wire disposed at a location corresponding to said pressure plate whereby upon movement of said slidable support towards said second active position said pressure plate causes said steel wire to move towards said second position, and said steel wire causes said actuator to move towards said engaged position whereby said cut-out contact is urged into said second closed position.

\* \* \* \* \*